Jan. 15, 1924.

K. SHAFFER 1,481,032

MEANS FOR LOCKING AUTOMOBILE TIRES

Filed July 1, 1922

Inventor
Kent Shaffer.
By
Attorney

Patented Jan. 15, 1924.

1,481,032

UNITED STATES PATENT OFFICE.

KENT SHAFFER, OF DENVER, COLORADO.

MEANS FOR LOCKING AUTOMOBILE TIRES.

Application filed July 1, 1922. Serial No. 572,342.

*To all whom it may concern:*

Be it known that I, KENT SHAFFER, a citizen of the United States, residing at the city and county of Denver and State of Colorado, have invented certain new and useful Improvements in Means for Locking Automobile Tires; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to means for locking the spare automobile tire in place on the machine.

It is essential, in order to be properly safeguarded against unpleasant and annoying delays due to tire trouble, that one or more spare tires be carried, and this custom is now almost universal. It has been found from experience that spare tires which are not securely locked in place are frequently stolen. In order to carry spare tires with any degree of assurance that they will be there when needed, it is essential that they shall be locked to the car in such a manner that an unauthorized person can remove them only with great difficulty, if at all.

It is the object of this invention to provide a simple and effective means for locking a spare tire to the car, and consists briefly in inserting the valve stem through an opening in a bracket that is non-removably connected to the car body, and then applying a nut to the stem and locking the nut against rotation, whereby the tire becomes locked to the bracket by means of the stem.

In order to more clearly describe my invention, I shall have reference to the accompanying drawing, in which Fig. 1 shows the rear of an automobile with the spare tire held in place thereon;

The same reference numerals will be used to designate the same parts throughout the several views.

Figure 1:
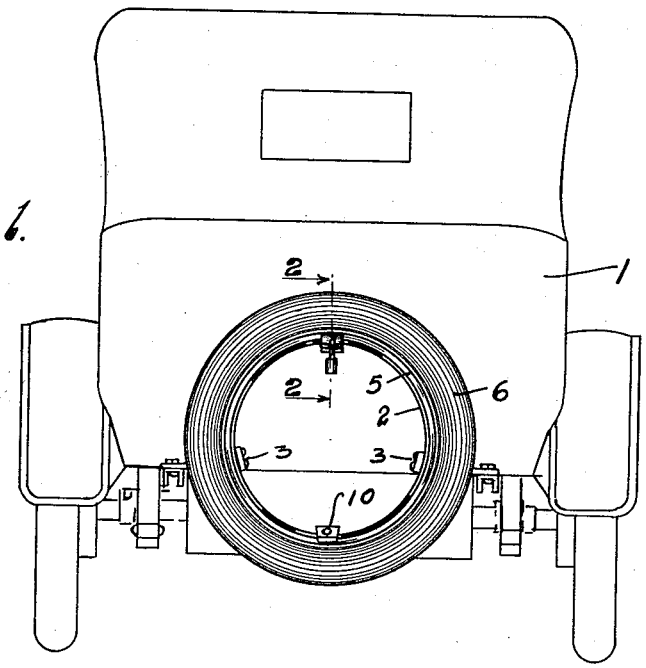

In the drawings, numeral 1 represents the body of an automobile, to the rear end of which is secured a tire-holding device consisting of a rim 2, which is non-removably secured to the body by means of suitable brackets 3. Rim 2 has an inner upstanding flange 4 which limits the inward movement of the demountable rim 5 which carries the tire casing 6. Rim 2 is provided at the top, or at any suitable place, with a hole 7 for the reception of the valve stem 8. The tire casing 6 and inner tube 9 are assembled in the usual manner on the demountable rim 5, after which they are inflated to the desired pressure. The spare tire is then mounted on the carrier with the valve stem extending through the opening 7, after which clamp 10 is screwed into place for the purpose of holding the tire against removal, all in the manner common and well understood. The tire carrier described briefly above is one of the well known carriers in general use and forms no part of my invention, but has merely been described and shown in order to describe my invention which cooperates with it.

The usual method of locking a spare tire to a carrier of the above described type is to pass a cable or chain around the tire and carrier and fasten the ends with a padlock. This method is unsightly and unreliable, since a cable or chain may be instantly severed by means of a suitable cutting tool.

It is apparent that in order to remove the spare tire from the carrier, it will be necessary to withdraw the valve stem 8 from the hole 7 in the rim 2. If means is provided for preventing the stem 8 from being withdrawn, it is evident that the tire cannot be removed without first breaking the valve stem. My invention is directed to means for preventing this withdrawal.

Figure 2:
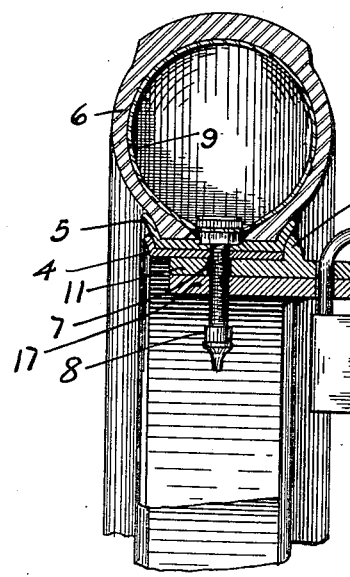
Fig. 2 is a transverse section taken on line 2—2, Fig. 1.
Figure 3:
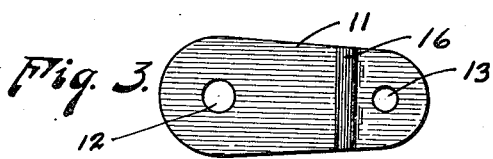
Fig. 3 is a plan view of one of my locking members.
Figure 4:
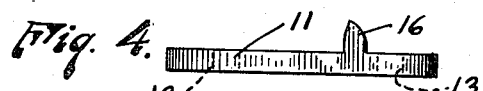
Fig. 4 is a side elevation thereof.
Figure 5:
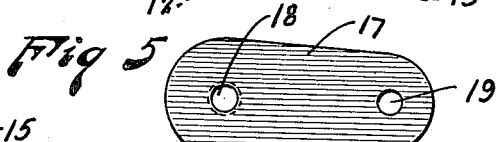
Fig. 5 is a plan view of the other locking member.
Figure 6:
Fig. 6 is a side elevation therof.

Referring now more particularly to Figs. 2 to 6, inclusive, numeral 11 indicates a clamping member provided at one end with a hole 12 through which the valve stem 8 extends, and at the other end with a hole 13 adapted to receive the locking bail 14 of a padlock 15. Member 11 is provided transversely thereof with a lug 16 which engages the edge of rim 2 in the manner shown in Fig. 2, and prevents the part 11 from being rotated. A member 17, provided near one end with a threaded opening 18 adapted to cooperate with the threads on the valve stem, serves as a nut and clamps the member 11 in place against the rim 2, in the manner shown in Fig. 2. Member 17 is also provided near its outer end with a hole 19 that registers with hole 13 and is adapted to receive the bail 14.

The operation of my lock is as follows: When the tire has been put in place on the holder or bracket, member 11 is slipped onto the valve stem 8, after which member 17 is screwed into place until part 11 is clamped against the rim 2, in the manner shown in Fig. 2. The padlock 15 is then applied and prevents relative rotation of parts 11 and 17, while lug 16 prevents member 11 from rotating. It is apparent that when my locking devices have been applied to the valve stem in the manner shown, the spare tire cannot be removed without breaking the valve stem, which is very difficult as the stems are very substantially made. It is almost impossible to cut the stem with a hack saw or with any known cutting tool, as it must be cut between rim 2 and nut 17, which part is well protected.

From the above it will appear that I have invented a simple and effective means for locking a spare tire securely in place, that can be very cheaply made and sold and which can be quickly applied and removed.

Having now described my invention, what I claim as new is—

1. A device for locking a spare tire to an automobile, comprising a rim non-removably secured to the automobile, said rim having a hole therein adapted to receive a valve stem, a tire assembly, comprising a rim, an outer casing, an inner tube and a valve stem, mounted on said first mentioned rim in such a manner that the valve stem extends through the hole therein, a member provided with an opening for the reception of the valve stem, a lug on said member for engaging the rim, a nut for holding said member in place, and means for locking said nut and member against relative rotation.

2. A device for locking a spare tire to an automobile, comprising a rim non-removably secured to the automobile, said rim having a hole therein adapted to receive a valve stem, a tire mounted on said rim in such a manner that the valve stem projects through the hole, a member having an opening adapted to receive the valve stem and provided with a lug for engaging the edge of the rim, an elongated nut adapted to engage and cooperate with the valve stem to clamp said member against the rim, and means for locking said nut against rotation.

3. Means for locking a tire to a tire-holder comprising a member having an opening near one end for the reception of a valve stem, an opening near the other end for the reception of a locking member, said member also having a projection intermediate said openings, said projection being adapted to engage the sides of the holder, an elongated nut having a threaded opening adapted to cooperate with the threaded valve stem and another opening adapted to register with the corresponding opening in the first mentioned member and to receive the locking member whereby the two members are locked against relative rotation.

In testimony whereof I affix my signature.

KENT SHAFFER.